Oct. 24, 1967 R. E. O'BRIEN ETAL 3,348,748
PLASTIC SHEET ADVANCING APPARATUS
Filed July 22, 1965 13 Sheets-Sheet 1

INVENTORS
ROBERT E. O'BRIEN
EDWARD C. MARKOWSKI
BY
*Price & Heneveld*
ATTORNEYS

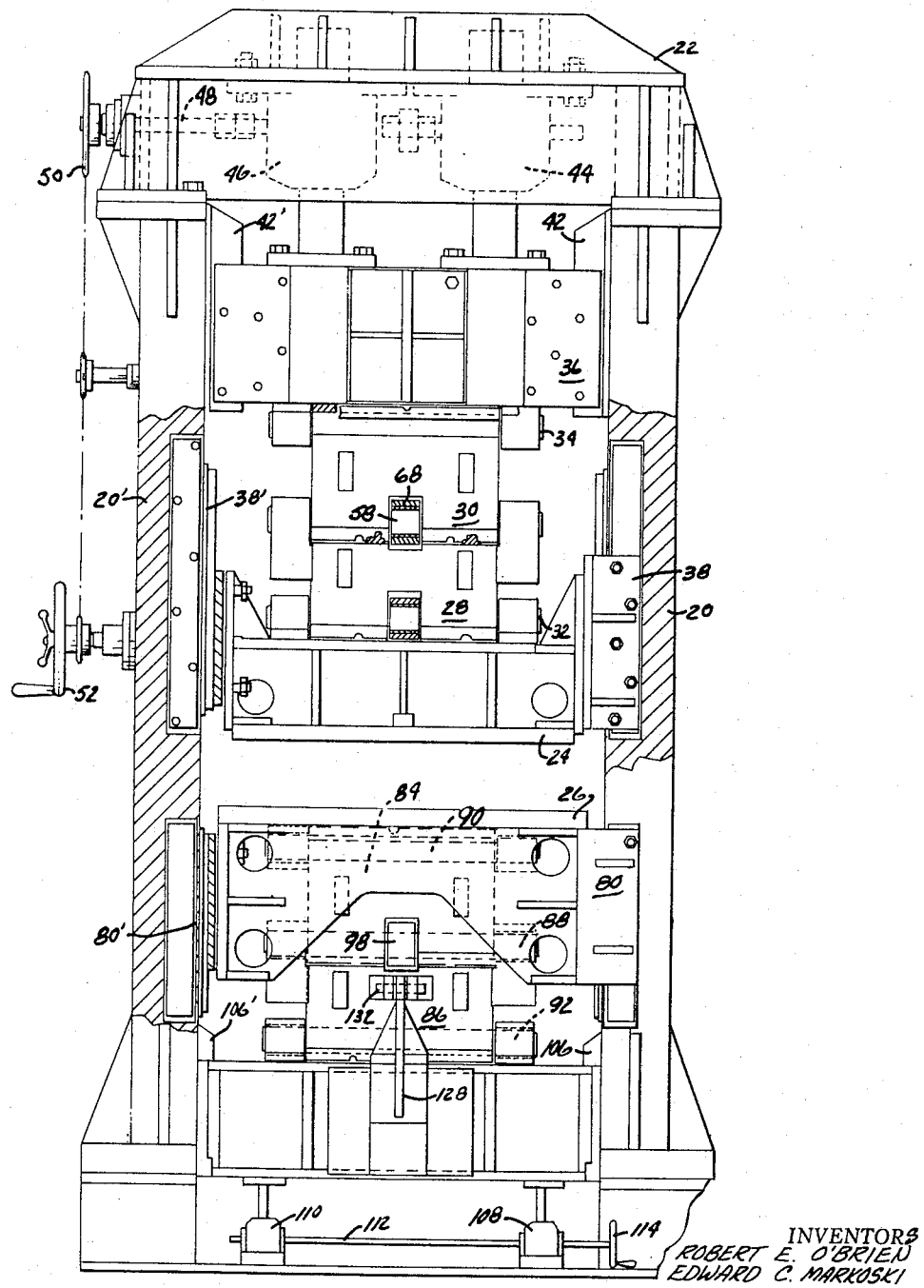

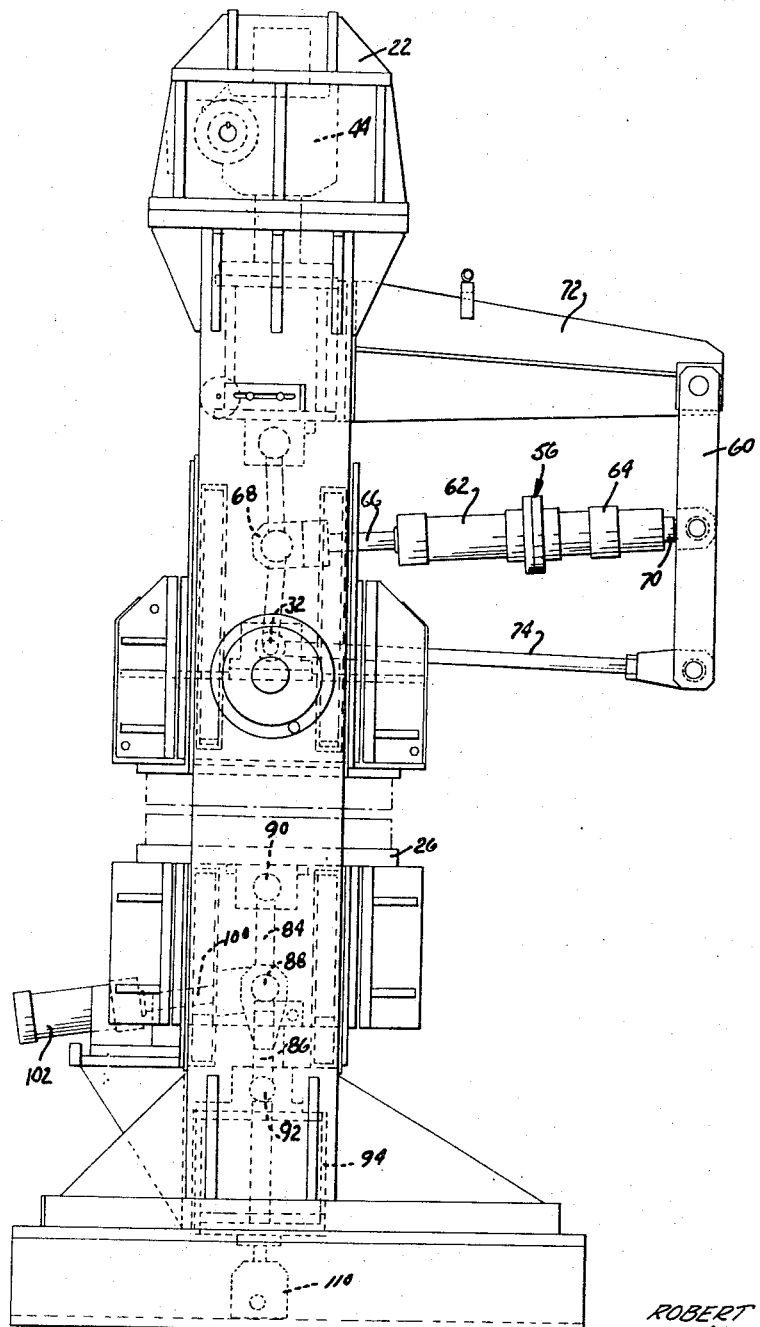

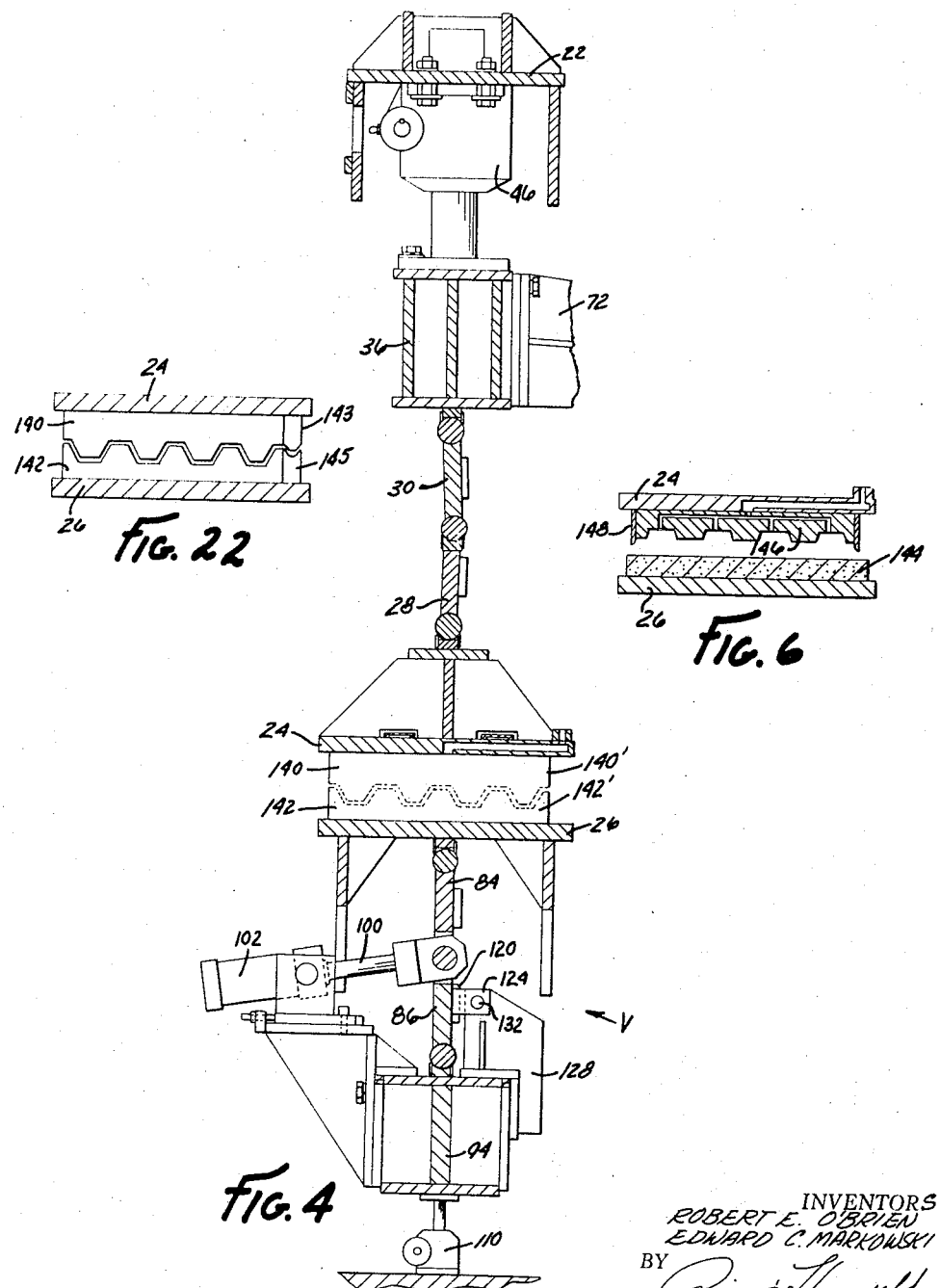

Oct. 24, 1967     R. E. O'BRIEN ETAL     3,348,748
PLASTIC SHEET ADVANCING APPARATUS
Filed July 22, 1965                                                      13 Sheets-Sheet 8

INVENTORS
ROBERT E. O'BRIEN
EDWARD C. MARKOWSKI
BY
ATTORNEYS

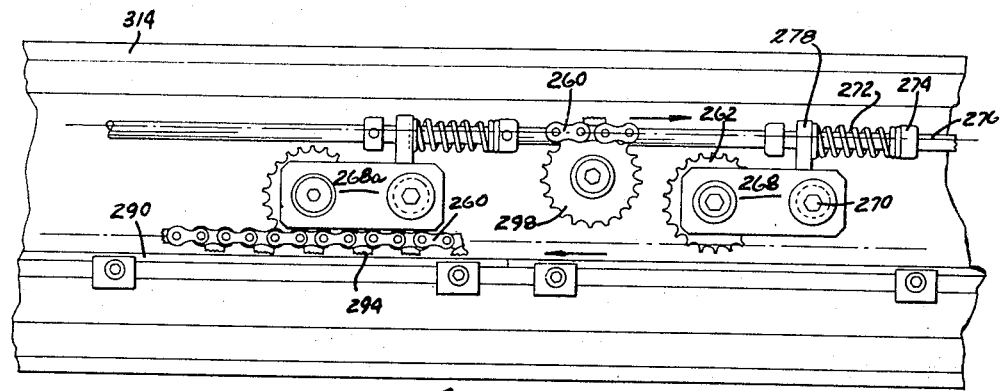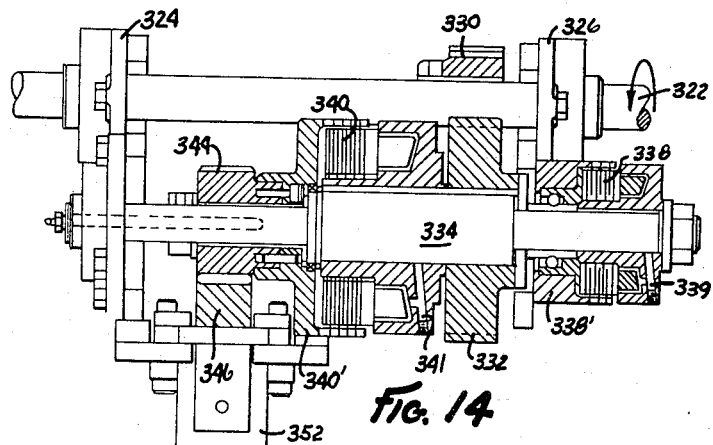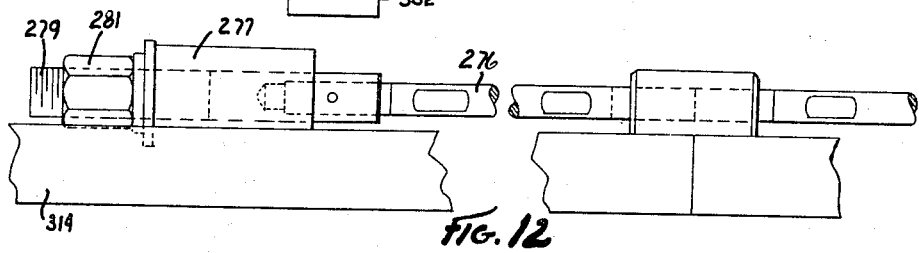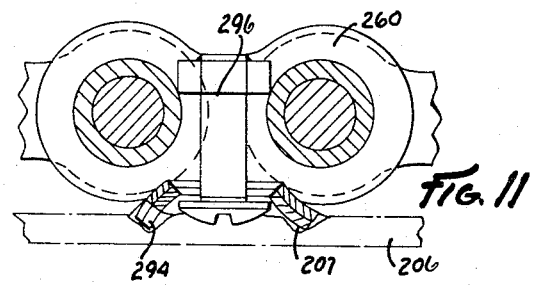

Oct. 24, 1967 R. E. O'BRIEN ET AL 3,348,748
PLASTIC SHEET ADVANCING APPARATUS
Filed July 22, 1965 13 Sheets-Sheet 10

INVENTORS
ROBERT E. O'BRIAN
EDWARD C. MARKOWSKI
BY Price & Heneveld
ATTORNEYS

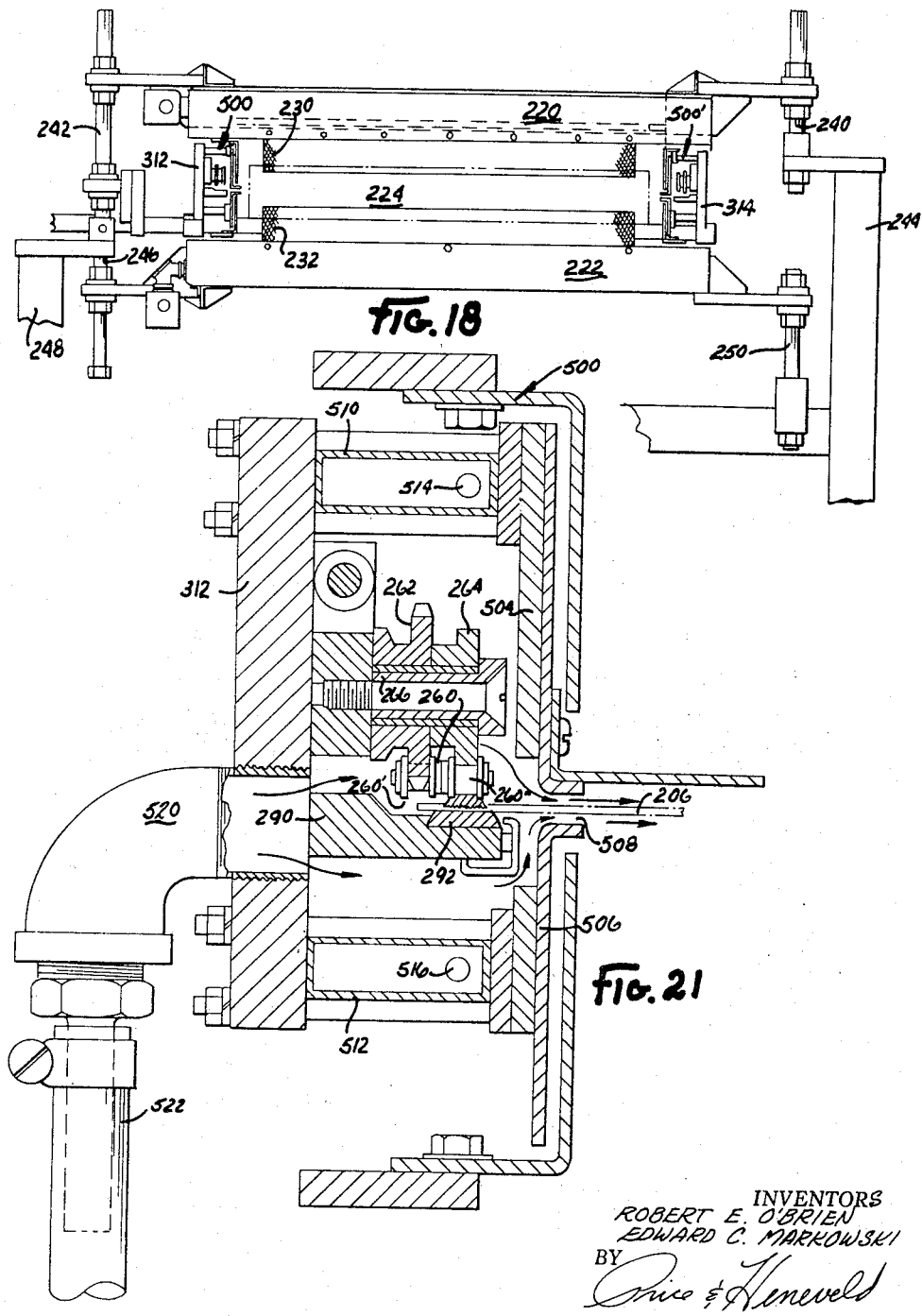

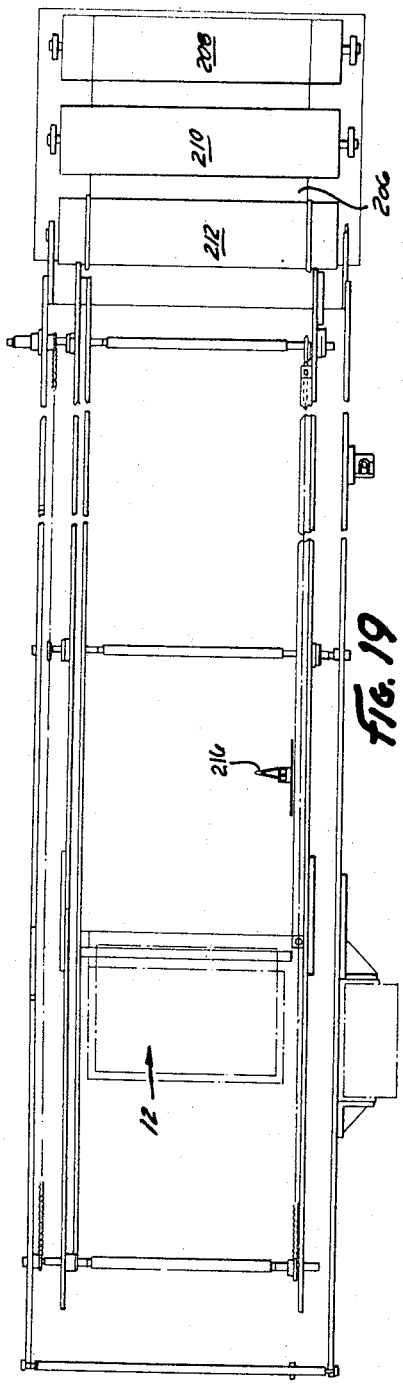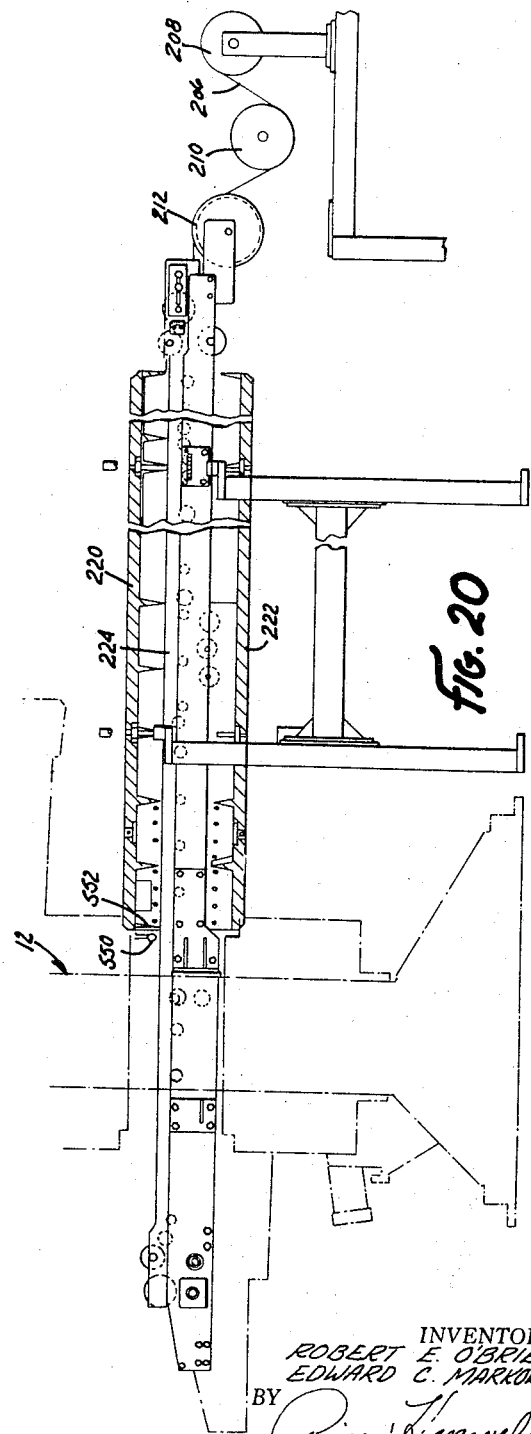

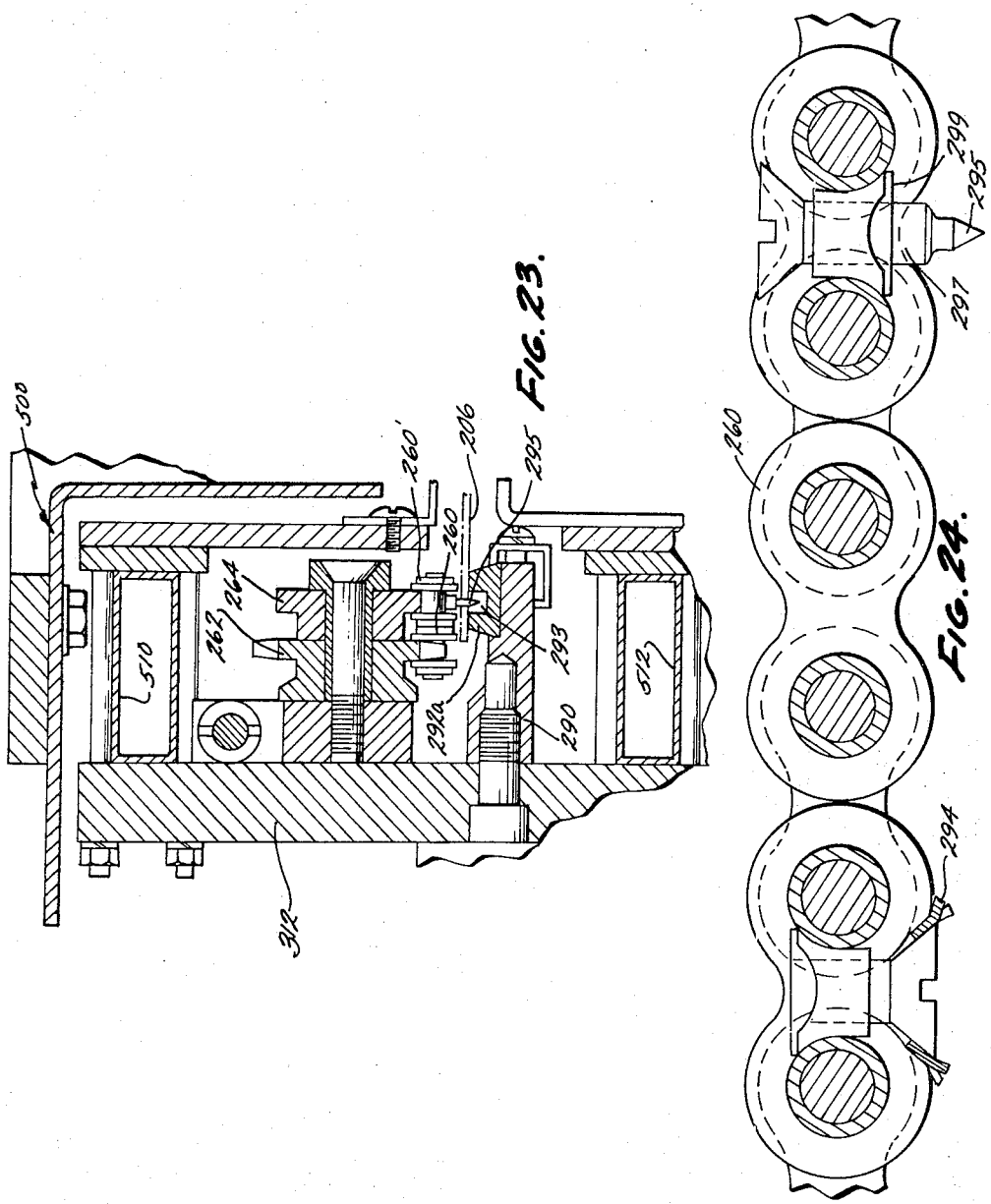

United States Patent Office 3,348,748
Patented Oct. 24, 1967

3,348,748
PLASTIC SHEET ADVANCING APPARATUS
Robert E. O'Brien and Edward C. Markowski, Grand Rapids, Mich., assignors to Kirkhof Manufacturing Corporation, Grand Rapids, Mich., a corporation of Michigan
Filed July 22, 1965, Ser. No. 474,034
12 Claims. (Cl. 226—53)

ABSTRACT OF THE DISCLOSURE

Plastic web advancing apparatus for forming equipment, employing circuitous advancing means with excellent gripping facility, uniformly controlled tension, and accurately regulated intermittent forward movement.

---

This invention relates to apparatus for handling continuous plastic web and forming three-dimensional articles therefrom, and more particularly relates to apparatus for advancing a plastic web through a preheat oven into a forming press, and advancing the formed articles and surrounding web matrix out of the press.

Forming presses operably on thermoplastic web stock are capable of forming thousands of plastic articles by pressure differential and/or matched die forming techniques on a continuous basis.

Some web stock material can be pulled through the press by pulling on the discharge matrix end of the web after it leaves the press, using gripping and intermittently shifting mechanism. When heat is applied to heavier web or foam type web prior to entry into the press, however, using a preheat oven, the web can not be pulled through the equipment from the discharge end. This is because the heated web is softened and becomes substantially weakened. This condition is necessary for forming, but does not allow tensile pulling force to be applied to any extent. Present web advancing apparatus employs edge gripping and pulling means to advance the sheet. These present units present real problems, however, particularly with a foam type web stock. The gripping mechanism distorts, crumples and wrinkles the web edges so badly, post-forming equipment handling the sheet downstream of the preheating and forming operations often cannot obtain a good dependable grip along the sheet. Some portions may grip while others do not. The edges of foam-type sheets are particularly subject to becoming severely buckled and distorted.

In addition, present gripping means, usually several feet long, e.g. about 15–25 feet, usually have cumulative tolerance differences between individual members of the gripping devices so that over the length of the unit, only intermittent gripping occurs, with ungripped areas therebetween. Thus, one or several portions of the web may not be gripped effectively. Since the device on the opposite edge of the web probably will grip in different places along the web, frequently the web is diagonally distorted and wrinkled as it advances. This causes distortion of the articles formed from the web, and also frequently results in loss of registry of spaced printed patterns on the web with the forming dies in the press.

Still another problem area exists with present edge gripping devices, that of obtaining uniform squeezing of all portions of the edges between the grippers. One common method of varying this squeezing action is to have a plurality of spaced idler members which are shiftable toward the web. These are difficult to get into proper coordinated relationship, however, so that along one section of the device the web is squeezed more tightly than at others. If one edge is gripped tighter than the opposite edge, this tends to elongate the web and distort it diagonally.

These and related disadvantageous features are particularly troublesome when handling foam type web material, since the foam expands in thickness very substantially when heated. The foam expands between the links of the gripping mechanism to be doubly distorted. The foam web actually tends to bind and stall with present devices, particularly in the preheat oven, causing potential web stock damage, downtime, and related inconveniences.

It is an object of this invention to provide a novel plastic web handling and advancing apparatus that achieves dependable, uniform advancement of a heated, softened web along its entire edges.

Another object of this invention is to provide a plastic web feed apparatus that achieves excellent and uniform gripping on the web edges, along the entire length of the web, rather than at only unpredictable intervals. The apparatus has a controlled, uniform, preset pressure gripping on the web edge along its length, enabling simultaneous variation in the squeezing action of the entire device over its length. This entire gripping action change can be varied easily and quickly, even while the preheat oven and forming press are in operation. No shut down or disassembly of the equipment is necessary. The web, regardless whether thin or thick, or whether solid or foam type, is not severely distorted or broken where gripped. It does not diagonally draw from edge to edge. It retains its registry uniformly over its length, assuring coincidence of pattern areas with the forming dies of the press.

Another object of this invention is to provide web handling and advancing apparatus even capable of advancing heated and thus expanded foam type web material uniformly, without loss of registry, without serious marring of the sheet edges, and in a completely controlled manner. The edges are retained and advanced with controlled regulatable pressure, even through the heating oven where the foam material swells and expands.

These and several other objects of this invention will become apparent upon studying the following specification in conjunction with the drawings in which:

FIG. 2 is an elevational view, partially sectioned, of the infeed side of the press apparatus in FIG. 1;

FIG. 3 is a side elevational view of the right side of the press apparatus as shown in FIG. 1;

FIG. 4 is a sectional view taken through the center of the press apparatus;

FIG. 6 is a fragmentary, sectional, elevational view of an alternate set of pressure differential forming die inserts for the matching die elements shown as part of the apparatus in FIG. 4;

FIG. 10 is an enlarged, fragmentary, elevational view of a portion of the web advancing apparatus on the left-hand side of the press as viewed in FIG. 1;

FIG. 11 is a greatly enlarged, fragmentary, elevational view of one small portion of the roller chain in FIG. 10;

FIG. 12 is an enlarged, plan, fragmentary view of controlled biasing means forming part of the sheet advancing apparatus shown in FIG. 10;

FIG. 14 is a sectional view of the apparatus in FIG. 13, taken on plane XIV—XIV in FIG. 13;

FIG. 18 is an end elevational view of the entrance to the preheat oven;

FIG. 19 is a plan view of the web handling apparatus in this assembly;

FIG. 20 is a side elevational, sectional view of the preheat oven and web handling apparatus in this assembly, showing the press in phantom;

FIG. 21 is an enlarged, sectional view of one of the two like cooling tunnels along opposite sides of the preheat oven, both being shown on much smaller scale in FIG. 18, and the web advancing means associated therewith;

FIG. 22 is a side elevational view of the dies in FIG. 4 showing an alternate web control means to that in FIG. 17;

FIG. 23 is a fragmentary, sectional elevational view of a modified form of web advancing means within one cooling tunnel, and modified from the one shown in FIG. 21; and FIG. 24 is a greatly enlarged fragmentary view of the modified advancing chain used in the subassembly in FIG. 23, and modified from the one shown in FIG. 11.

Figure 1:
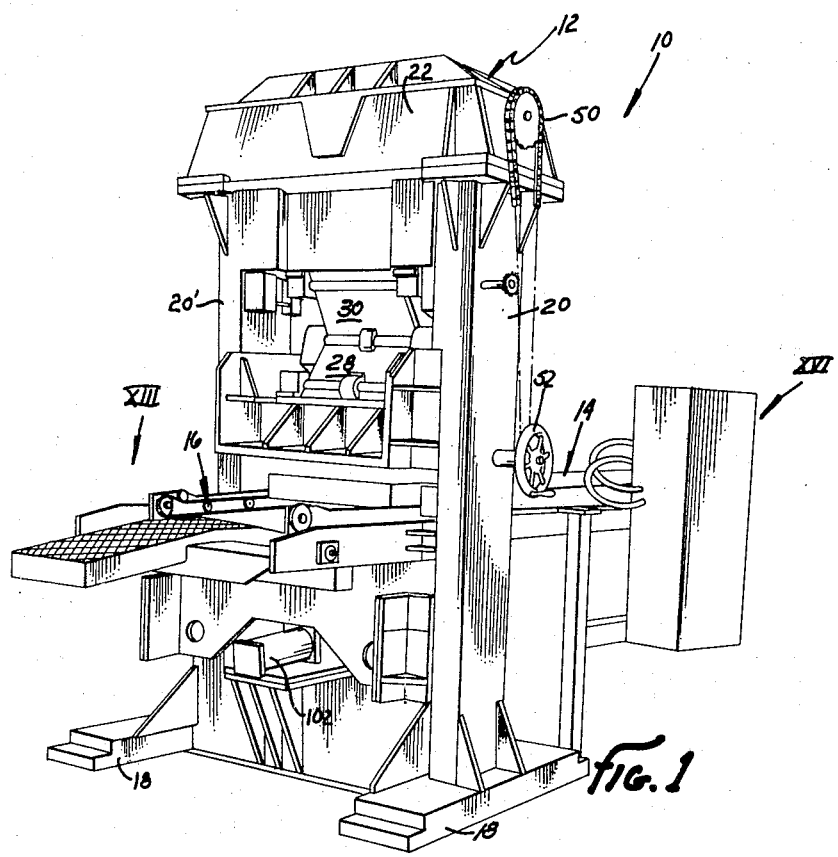
FIG. 1 is a perspective view of the apparatus, viewing the discharge end of the forming press apparatus and cooperative preheat oven equipment.
Figure 5:
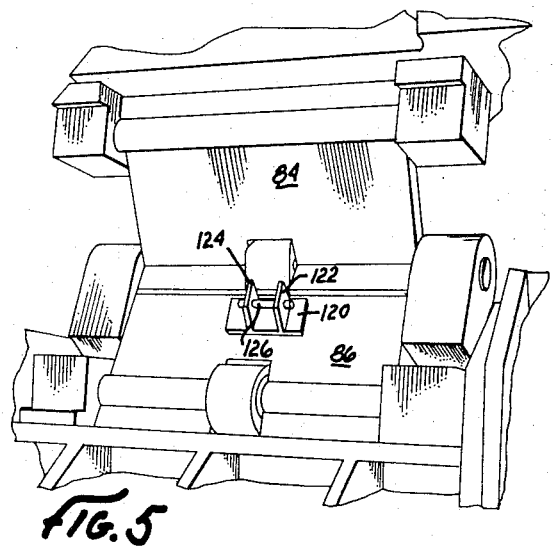
FIG. 5 is an enlarged, fragmentary, perspective view of the lower platen toggle linkage of the press, taken generally from the direction of arrow V in FIG. 4.

Referring now specifically to the drawings, the complete web handling and forming apparatus 10 includes a forming press assembly 12, a preheating oven assembly 14 leading into the forming press, and a web gripping and advancing means 16 which extends through the entire oven and through the press to discharge the web matrix and formed articles on the opposite sides of the press from the oven.

FORMING PRESS ASSEMBLY

The press 12 includes a basic frame structure which includes a base support footing 18, a pair of spaced, parallel upright pillars 20 and 20' extending upwardly from the footing and interconnected at the upper end by a rigid cross beam 22.

The sheet or web advancing means 16 extends generally horizontally through the central portion of the press, in the space between pillars 20 and 20'. Above this advancing means is upper platen support and control means, and below it is lower platen support and control means.

More specifically, the upper platen 24 is spaced closely adjacent the lower platen 26 therebeneath, (FIG. 2) while being suspended from the upper cross beam 22 by controlled positioning means. The upper platen is suspended on a toggle linkage which includes a lower plate-type link 28 pivotally connected at its upper end to an upper plate-type link 30. The lower link is pivotally connected on horizontal shaft 32 to the upper platen. The upper link is connected on a horizontal pivot shaft 34 to a carriage 36. This carriage adjustably suspends the upper platen. The lateral ends of upper platen 24 are vertically slidably engaged with guide slide bearings 38 and 38', with 38' being partially cut-away in FIG. 2 to show the structure. These slide bearings are mounted on support pillars 20 and 20'. Bending of the toggle linkage therefore causes upper platen rising, and straightening of the upper toggle linkage causes upper platen lowering.

Also, the initial operating position of the upper platen can be controlled by adjusting carriage 36 up and down on its slide bearings 42 and 42', using a pair of screw jacks 44 and 46, both operated through a shaft 48 by a chain and sprocket mechanism 50. The chain and sprocket mechanism is operated by a hand crank 52.

The upper toggle linkage is actuated by hydraulic cylinder means 56 (FIG. 3) which extends from pivot shaft 58 (FIG. 2) between the two links of the toggle, and link 60 (FIG. 3) of a stabilizer linkage. Fluid cylinder means 56 has a piggyback end-to-end double cylinder assembly with the back ends of first cylinder 62 and second cylinder 64 fixed together. The rod 66 of cylinder 62 extends to collar 68 that fits around shaft portion 58. The second cylinder 64 has its rod 70 extending in the opposite direction to a pivotal conection in the center of link 60. This link 60 is mounted pivotally on its upper end to a rigid centilever beam 72 mounted to the slide 36. The lower end of link 60 is pivotally connected to a rod 74 that extends back to a pivotal connection on the lower shaft 32 of the toggle linkage to the upper platen. This linkage absorbs the horizontal component of the thrust exerted by lower plate-type link 28 against shaft 32, thus stabilizing the upper platen by allowing only the vertical component of the thrust of link 28 to act upon it extension of the first cylinder 62 causes the toggle linkage to almost straighten, but not quite to a coplanar position of the links. Extension of the second cylinder 64 causes final shifting of the toggle linkage to its extended upright position with the links coplanar, for the last portion of the upper platen stroke.

The lower platen construction is special, especially when combined with this upper platen assembly. More specifically, lower platen 26 is also mounted with its lateral ends in sliding contact with slide bearing means 80 and 80' on columns 20 and 20' so that it can be vertically adjusted. It has a toggle linkage which includes an upper toggle plate 84 and a lower toggle plate 86 linked together on a horizontal transverse pivot axis 88. The upper end of link 84 is also pivotally connected on a parallel shaft 90 to lower platen 26 (FIG. 3). The lower link 86 is pivotally connected on a parallel shaft 92 to a lower platen carriage 94. The ends of these shafts are supported in journals for smooth action in their parallel relationship. Connected on a bearing to the center of shaft 88 is a collar 98 that is mounted to the end of rod 100 of fluid cylinder 102 (FIGS. 1, 3 and 4). This fluid cylinder is pivotally mounted to the press to enable the lower platen linkage to be extended or folded.

Lower platen carriage 94 is adjustably mounted within slide bearings 106 and 106' for slight vertical movement by means of jacks 108 and 110 operated through a common shaft 112 by a hand crank 114 or the equivalent. Adjustment of these upper and lower carriages is for initial positioning of the apparatus to suit a particular set of dies, thickness of webbing, or other like factors.

The lower platen, as well as the upper platen, can therefore be raised or lowered by extending and contracting its actuating cylinder to extend and fold its toggle linkage. It also can be anchored or locked in a rigid, stable, pre-selected fixed condition, with the lower platen at its upper position. More specifically, referring to FIGS. 2, 3, 4 and 5, there is affixed to lower toggle plate 86 an anchoring or locking yoke. It includes a plate 120 and a pair of laterally extending spaced parallel plates 122 and 124 having aligned openings 126. These plates are adapted and positioned to straddle a rigid anchor plate 128 (FIG. 2 and FIG. 4) when the lower toggle linkage is fully extended as shown in FIG. 4.

When the lower toggle linkage is extended, with lower platen 26 in its uppermost position, it can be locked in this position by inserting a cross pin or anchor pin 132 through openings 126 in the yoke, and a corresponding opening in anchor plate 128 in the manner shown in FIG. 2. It will be noted that the orifices in these interlocking components align when the lower toggle linkage is directly upright in its vertically colinear position. In this position, any thrust imparted to the lower platen by the upper platen is actually imparted directly through the bearings and journals, the lower toggle links being in direct compression, rather than tending to cause folding of the toggle linkage. The stresses are directly applied to the toggle linkage, with only minor stress being applied to the pin connection 132. The anchor plate 128 is attached fixedly to carriage 94 supporting the lower platen assembly, to be vertically adjusted with carriage 94, but to be specifically fixedly located in a particular position of the carriage.

The dual alternate function of this lower platen enables several different selected types of operations to be performed on the same press. More specifically, since both the upper platen and the lower platen have a substantial stroke, matching dies like those shown in phantom at 140 and 142 in FIG. 4 can be employed on materials to be physically deformed into three-dimensional articles. It can achieve high speed operation due to movement of both of the platens. These platens can be programmed, in a manner to be explained hereinafter, to operate simultaneously toward and away from each other, or to operate substantially, either with the upper platen moving first or the lower platen moving first, in controlled delayed fashion.

Also, since the lower platen can be locked in its elevated position, with resulting stability and inconsequential shifting of the lower platen under thrust, a set of pressure differential forming dies with a blade sealer and creaser like that shown in FIG. 6 can be employed. More specifically, a heated, porous, rigid surface element 144 is mounted to the lower platen 26, and a female pressure differential forming die 146 is mounted to the upper platen, the female die including a sealing and creasing knife edge 148 around its periphery Attachment of the dies can be by bolts, clamping brackets or any other expedient commonly used. The apparatus can be used even on extremely thin thermoplastic sheet material, using this knife element, yet with complete control of platen movement to thousandths of an inch. The blade, therefore, will exactly seal without creasing significantly, then will crease without complete severing so that the articles stay in the web to be transferred out of the press. This is possible because the lower platen is locked in an accurate relationship so that even the knife edge lowers controlled amounts with respect to the cooperative surface 144 on the lower platen. The double piggyback cylinder arrangement 62 and 64 shown in FIG. 3 is used to advantage by extending cylinder 62, for example, until the knife edge seals against the thin plastic sheet, then forming by pressure differential techniques, and then extending the second piggyback cylinder 64 to cause the knife to crease the plastic so that when the web is drawn out of the press and cooled, the article can be broken out of the web matrix.

By unlocking the lower platen, and reciprocating both platens toward and away from each other, matching dies like those at 140 and 142 in FIG. 4 can be employed to advantage on the web stock. Normally, the stock on which such dies are used is of heavier construction, and frequently requires preheating prior to entry into the press. This is in contrast to the pressure differential dies in FIG. 6 where element 144 is usually heated to warm up the thin plastic web sufficiently to form it.

To achieve preheating, a preheat oven is used in combination with the press. To handle some materials, particularly foam type web stock, the oven and the web advancing means through the oven and press should have particular features like those described below.

PREHEATING OVEN ASSEMBLY

The oven assembly 14 extends a considerable distance in back of the forming press into which its feeds, as shown in FIGS. 1, 16, 19 and 20 for example. This oven apparatus 14 has a plurality of side-by-side heating units 200 juxtaposed horizontally. Heat is applied both upwardly and downwardly toward a central tunnel area in and through the oven. This oven has a web entrance 202 (FIG. 15) at its end furthest from press assembly 12. The oven is slightly wider than the width of the web 206 (FIG. 20) to be heated. The web is unwound from a spool 208 and passed over suitable guide rollers 210 and 212 into the oven entrance. The oven may actually contain a plurality of different temperature sections, each employing a separate temperature controller, including a sensor such as the one illustrative temperature sensor thermocouple 216 (FIG. 19). Three separate responsive controls are described in FIGS. 7A, 7B, and 7C hereinafter, to show control of three separate sections of the oven. In the particular oven illustrated in the circuit diagrams, the three separate heat zones may be substituted by one, two, four, or any number of sections.

Figure 16:
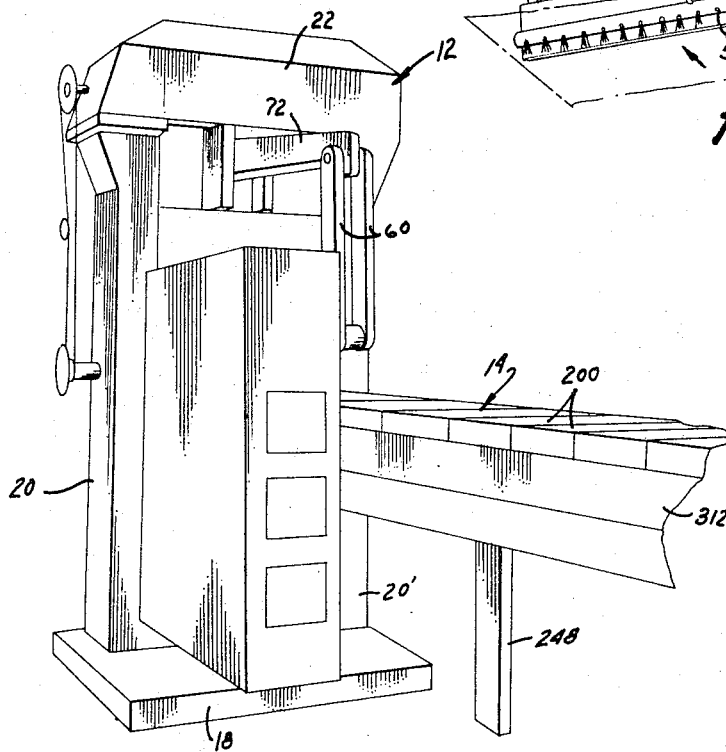
FIG. 16 is a perspective view of the preheat oven and press in FIG. 1, taken from the direction XVI in FIG. 1.

The oven as shown in FIG. 18, for example, has its upper segment 220 supported on stud-type columns 240 and 242 which in turn are mounted directly to supports as at 244, or to the stud-type column 246 that in turn is directed to the support 248. These supports extend to the floor as shown in FIG. 16. Likewise, the lower oven section 222 (FIG. 18) is mounted to the adjustable support 246 and stud-type column 250 which in turn are secured to the legs 248 and 244.

The oven has an upper zone 220 and a lower zone 222. Each has suitable heating means such as infrared bulbs directed upwardly and downwardly toward the web passage 224 therebetween. These heat sources are turned on and off in response to the controller and sensor units, to maintain a constant temperature. Since radiant heat sources such as electrical bulbs, when turned on and off, can cause highly fluctuating temperature variations on the web toward which they are directed, the web can easily be underheated or overheated in local areas. Also, since there are spaces between the bulbs, heat may be applied in some areas to a greater extent than others. To damped such fluctuations and to moderate the heat over the area, a special heat buffer and moderator means is provided in this oven. This moderator means also serves to help prevent overheating of the web in case of web advancing equipment failure causing the web to be stopped in the oven. The moderator absorbs a substantial share of the heat and gradually dissipates it to the web. The moderator in its preferred form comprises a pair of mesh-type open, metal sheets 230 and 232 on the top and bottom respectively (FIG. 15) of the oven, each being between its respective heat supply source and the web passage. The open mesh work allows a considerable amount of radiant heat to be directly exerted through the mesh onto the web passing through the passage. The mesh work has a substantial metal area and volume so that a considerable amount of the radiant heat is absorbed by the metal and passes onto the sheet, largely by heating the air adjacent the sheet. Even though the infrared bulbs are constantly turned on and off in response to the temperature control network, the metal mesh dampens and moderates the heat applied. This causes substantially uniform heating of the web for optimum dependability.

In the oven, the web material is heated to a substantial temperature, for example around 220 degrees if the material is a polystyrene, foam-type web. The web softens considerably to be subject to forming. In so doing, however, it is weakened in its physical characteristics such as tensile strength. Also, if the web is the foam-type, it expands considerably in thickness when heated. In the novel apparatus, means is provided for retaining proper web advancing relationship even during this heating operation in the oven. This is all operably associated with the sheet advancing mechanism to be described.

WEB ADVANCING APPARATUS

Figure 9:
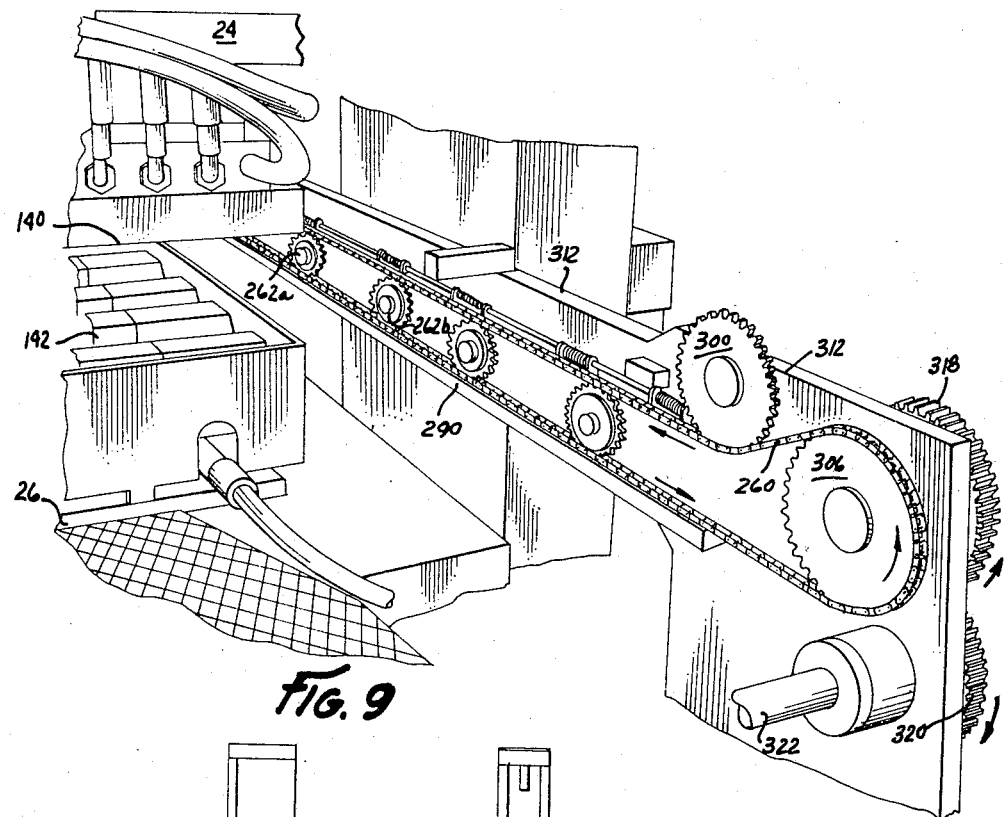
FIG. 9 is an enlarged, fragmentary, perspective view of one side of the discharge end of the forming press in FIG. 1, namely the side on the right-hand side of the apparatus in FIG. 1, showing part of the web advancing means adjacent the forming dies.

The web advancing apparatus 16, noted with regard to FIG. 1, is a chain mechanism. It includes an assembly portion on each side of the oven and press, one portion shown in FIG. 9 for the right side of the press as in FIG. 1, and the other portion shown in FIGS. 10 and 11 for the left side. Each is a mirror image of the other. That is, on each side of the preheat tunnel, and astraddle the platens in the press, is an elongated chain means to grip one edge of the web and advance the web through the preheat oven and the press and discharge it on the discharge side of the press opposite the oven. Each of the elongated chains, one of which is shown at 260 in FIG. 9, extends the entire length of the oven and the press to advance the sheet intermittently and dependably. The chain on each side may be a single roller chain, similar to motorcycle chain, i.e. made up of several roller links end-to-end. Preferably, however, it is a double roller chain assembly with the individual links integrally interconnected side-by-side as shown by the chain portions 260' and 260" in FIG. 21 as part of chain 260. That is, the links are not only interconnected pivotally, end-to-end, but are connected rigidly to each other side-by-side so that one chain section 260' can ride over a plurality of aligned sprockets 262, while the adjacent chain portion 260" rides on aligned biasing depressing wheels 264. Each sprocket and the adjacent wheel are both mounted coaxially on a rotation axis member 266 affixed to an individual pivot plate member 268 of the type shown in FIG. 10. An entire series of the spaced sprocket and wheel elements is mounted along each side of the apparatus as shown in FIG. 9 at 262a, 262b and the like. These are at reasonably spaced intervals as shown in FIGS. 9 and 10, with each sprocket and wheel unit being mounted on one of the rocker plates 268, 268a, etc. shown in FIG. 10. Each of the vertically shiftable plates is mounted on a horizontal, transverse pivot axis, e.g., 270, at its end opposite the attached sprocket so that it can be pivoted vertically in an arc to raise and lower the sprockets and wheel against the chains. This plate and its sprocket are biased downwardly by the action of individual coil compression springs 272 on rod 276. These springs each engage on one end against a respective fixed collar 274 affixed on the common rod 276. The other end of the springs engage an upwardly extending respective finger 278. Each finger has its lower end affixed to its respective plate 268. As can be noted, axial movement in a horizontal direction of the common adjustment rod 276 on which collars 274, etc. are mounted uniformly changes the compression of springs 272, etc. to vary the bias on plates 268, etc., and thus on the sprocket elements 262, etc. to vary the force applied against the chain 260. Axial movement of rod 276 varies all of these compression spring biasing values simultaneously and uniformly to cause a uniform compressive action on the chain all along its length. This is very significant for dependable web advancing.

The particular position of the common adjusting control rod 276 to control the bias of the several sprockets uniformly can be adjusted by using the apparatus in FIG. 12. More specifically, on the end of each of the rods 276 is a fixed collar 277 which receives the threaded end 279 of rod 276. A nut 281 threadably engages this end of the rod, and engages the fixed collar 277, so that, by rotation of nut 281, the axial position of the rod can be varied slightly to thereby uniformly vary the position of its several collars 274, etc. and the bias of compressing springs 272, etc. This collar 277 is affixed to the rigid side support of the apparatus, e.g. 314, to enable this adjustment to be made.

The chains are endless and recirculatory in character, each having a lower forward pass and an upper return pass, in the particular embodiment shown. The web is advanced by the chain portion in the lower pass. The lower pass as shown in FIG. 10, FIG. 9 and FIG. 21, is in a path of movement immediately adjacent an elongated fixed hard surface guide. This guide, more particularly, includes an elongated support plate 290 and an elongated hardened insert element 292 at the outer upper surface of the plate as shown in FIG. 21.

Chain 260 has toothed projecting portions protruding downwardly therefrom to contact the adjacent edge of the web and force it against the flat surface area forming a glide on this hardened plate insert so that, as the chain moves along this fixed glide plate, it advances the web in a controlled fashion. These projections are preferably in the form of a series of spaced star-shaped grippers 294 shown in exaggerated condition in FIG. 11. Each of the star grippers is generally annular in configuration, having a plurality of teeth which extend downwardly to project into the edge of the plastic web 206 (FIG. 11) and form small indentations 207 into the web to grip it. Each gripper may be an integral part of the chain link elements, may be riveted to the bottom of the link by suitable rivets, may be attached by small studs 296, or may be welded or otherwise suitably secured. In some instances, serrations may be formed directly in the adjacent link plates to form teeth. The uniformly adjusted plurality of biasing sprockets are adjusted with the apparatus in FIG. 12 to achieve exactly desired gripping action on the web, relative to its thickness. All portions of the chain grip uniform and dependable amounts so that advancement is neat, orderly, controlled, pre-set, and variably controllable even during operation.

It has been found with actual operation that this type of arrangement achieves excellent control over the driving characteristics of the web, with distortion of the web being only minor, i.e. mere tiny indentations into the web edge. Squeezing compression on the edges is uniform along the entire length of the web so that the web does not tend to ripple and pull diagonally across it, or to wrinkle or distort in other undesirable fashions.

As shown in FIG. 10, the return path of chain 260 moves in an elevated position over the tops of sprockets 262, etc. and may even be supported by supplemental idler sprockets 298 for smooth return.

Figure 15:
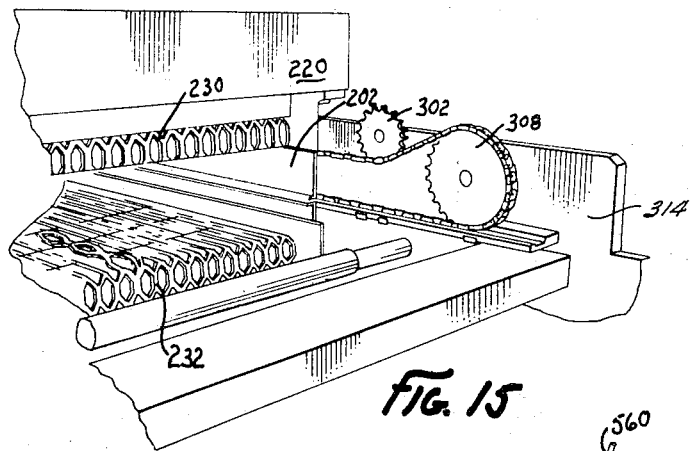
FIG. 15 is a fragmentary, perspective view of the entrance for the web into the preheat oven in FIG. 1 and FIG. 16.

The chain is kept in controlled tautness as by idler sprocket 300 (FIG. 9) adjacent one end, and a second idler sprocket 302 (FIG. 15) adjacent the opposite end (shown in FIG. 15 on the second chain opposite to the one shown in FIG. 9). Each of these chains passes around a major sprocket at each end of the assembly, illustrated for example by sprocket 306 at the discharge end of the press in FIG. 9, and by sprocket 308 at the entrance end of the oven in FIG. 15. These are mounted to the elongated support and enclosure side plate elements 312 (FIGS. 9 and 18) and 314 (FIGS. 15 and 18) on opposite sides of the oven.

Figure 13:
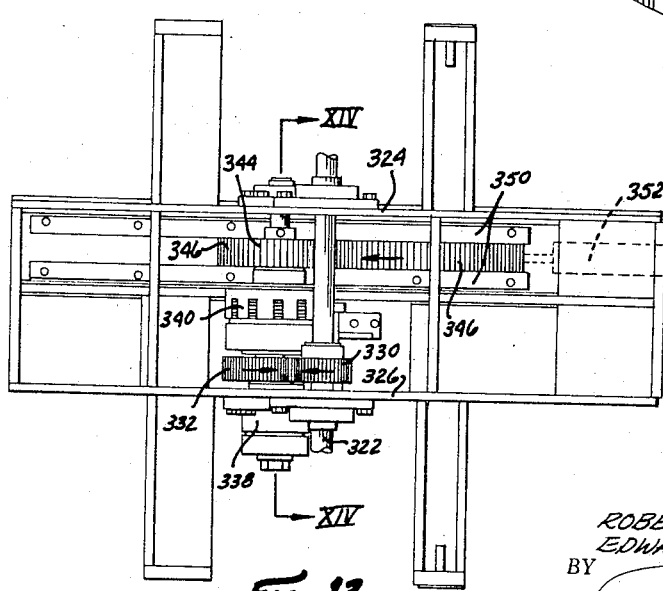
FIG. 13 is a plan view of the discharge portion of the press, taken from the direction XIII—XIII in FIG. 1, and showing the drive mechanism for operating the sheet advancing apparatus.

Coaxial with sprocket 306 (FIG. 9) and also rotatably mounted on support 312 is a driven spur gear 318. It is engaged with a driving gear 320 mounted on the end of drive axle 322. Drive axle 322 is rotatably suspended in bearing supports 324 and 326 (FIGS. 13 and 14). Mounted on drive axle 322 is another spur gear 330 engaged with spur gear 332 keyed to shaft 334 (FIG. 14). Also mounted on shaft 334 is a hydraulically operated brake 338 and a hydraulically operated clutch 340. Brake 338 has its housing 338' affixed to the frame of the assembly so that when the brake is engaged, shaft 334 is locked against rotation. The housing 340' of clutch 340, on the other hand, is connected to a spur gear 344 that engages an elongated gear rack 346. This gear rack is slidably retained between bearing slide mounts 350 (FIG. 13), and is operably connected to the output shaft of a fluid cylinder 352 which is designated in this device as an indexing cylinder. With extension of cylinder 352, rack 346 is extended to rotate spur gear 344 and thus, rotate shaft 334. When brake 338 is engaged, with retraction of the cylinder and gear rack, shaft 334 is locked against rotation and clutch 340 merely slips. When the gear and rack is moved forwardly and the hydraulic clutch is engaged, the hydraulic brake is always released so that movement of the spur gear 334 turns the clutch assembly, and thereby, turns spur gear 332, gear 330 and output drive shaft 322, to shift the chain type, web advance assembly a specific amount. This amount is set to cause one section to move into the forming dies while another section moves out of the forming dies. Both the clutch and the brake, mounted on the same shaft, are purposely operated from the same hydraulic control valve so that the clutch and brake are never simultaneously activated. Rather, they are always alternatively activated, as will be explained in detail with respect to the hydraulic control system in FIG. 8.

The use of these star grippers works excellently on foam type web stock to effect positive web advancement along the glide surface means. When the press is used on solid (unfoamed) web stock, however, it has been found preferable to employ the modified advancing means shown in FIGS. 23 and 24. The structures shown in these figures is essentially similar to that in FIGS. 21 and 11, except that portion 260″ of chain 260 has, in addition to grippers 294, intermittently spaced web puncture needles 295 mounted thereto. Each of these has an integral threaded screw stem 297 and a head, interfitted with a threaded sleeve 299 to secure it between the rollers and links of the roller chain.

These downwardly projecting pointed needles cooperate with a modified glide insert plate 292a. This glide member has a central elongated groove 293 along its length to receive the needles, and a pair of coplanar, flat, straddling shoulders forming slide surface area cooperative with the star grippers. This combination is found to effect excellent positive advancement of unfoamed plastic web stock without significant distortion of the web.

BASIC FLUID SYSTEM

This hydraulic control system is supplied from a suitable pressure fluid supply shown schematically at 400. The fluid is supplied through line 402 to any of the cylinders, i.e. for the upper platen cylinder, the lower platen cylinder, the index cylinder, and also to the brake and to the clutch. Fluid can be supplied through the single solenoid control valve C either to the brake or the clutch, alternatively, not both, through the valve assembly. This prevents any accidental partial shifting of the web when it is supposed to be stopped or supposed to shift a full section, to cause loss of registry, fouling of the equipment, distortion, etc. Loss of registry is particularly damaging if certain printed areas on the web lose registry with the forming dies. Advancement of the web is only under exactly controlled conditions, in intermittent fashion, for exact amounts, on a programmed basis.

Clutch 340 includes conventional clutch plates, housing components, and fluid inlet means 341. Brake 338 is very similar to the clutch, including friction plates, housing components, and fluid inlet means 339.

Fluid supply 400 also supplied the indexing cylinder 352 just mentioned, through a solenoid operated control valve D to actuate it for extension and retraction. Extension is simultaneous with clutch actuation to advance the web. Retraction is simultaneous with brake actuation to hold the web stationary with return (retraction) of the rack.

Figure 8:
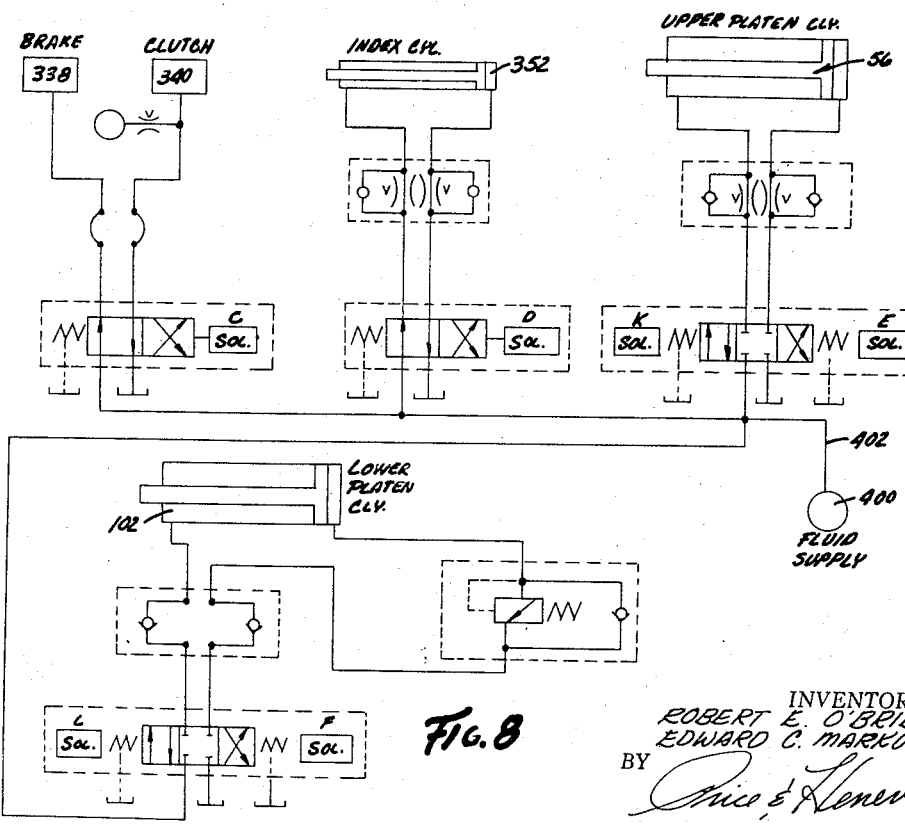
FIG. 8 is a fragmentary diagrammatic view of the main components of the hydraulic control and operating system for the apparatus.

Also, fluid is supplied to the upper platen cylinder assembly 56 shown schematically in a very simple form in FIG. 8, and to the lower platen cylinder 102. It is controlled through the respective solenoid operated valves E and K for upper platen cylinder means 56, and L and F for lower platen cylinder 102. The purpose for the double action valves in this instance will be explained hereinafter with respect to the electrical control system and the alternative methods of operating this universal press.

EDGE TUNNEL COOLING

Special cooling structure is provided along each edge of the tunnel as shown at 500 and 500′ in FIG. 18, and shown in enlarged form by FIG. 21 to assure proper advancing of the soft, weak, heated web. The advancing chains with their pluralities of sprockets are mounted in these cooling tunnels. The outer walls of the tunnels are formed by the supports 312 and 314 as shown in FIG. 21 for unit 500. These cooling tunnels extend the entire length of the oven to achieve controlled edge conditions on the web even though the central portion of the web is heated to several hundred degrees. Each tunnel also has inner, enclosing, vertical, elongated flanges 504 and 506 spaced from and parallel to support 312 to close off all of the tunnel area except for an elongated central slot 508 between them. These slots are oriented in coplanar fashion between the respective tunnels and the adjacent oven passage. Each slot is adjacent its chain 260 so that the web (shown in phantom in FIG. 21) 206 has its edges extending through the slots into the cooling tunnels. Each edge is gripped between the respective chain 260 and the hardened insert 292 of the flexed plate 290.

This tunnel is partially cooled by water heat transfer, and partially by pneumatic flow of cool air. More specifically, the top and bottom of each tunnel are enclosed by elongated water conduits 510 and 512. These have suitable inlet and outlet ports 514 and 516 for water passage. Supplementing the cooling action of these water ducts is a plurality of spaced air inlets along the length of the tunnel.

More specifically, referring to FIG. 21, one of the inlets is shown by the elbow connection 520 into the support enclosure plate 312, this elbow being connected to a cool air hose 522 for supplying cool air constantly through the outlet of the elbow and into the tunnel area. The air, directed generally inwardly toward the slot, divides as shown by the arrows in FIG. 21, to pass above and below the elongated plate 290, and thence over the chain and the edge of the web, through the outlet slot 508 and into the web passage. The air just bleeds slowly through these outlets under normal conditions so that, while it helps to maintain the edges of the web cool and sturdy, it does not cool the central portion web inside the oven passage. Its flow through the slots is just sufficient to prevent the heated air in the passage from flowing in the reverse direction to heat up the mechanism and web edges inside these cooling tunnels.

These cooling tunnel devices also have another function. That is, air inlet flow, although normally at a small slight bleed rate, is capable of achieving rapid cooling of the web in case of failure of the advancing equipment. If the advancing equipment fails in some manner and does not move the web in intermittent fashion according to the predetermined time intervals, a valve will open which will cause air to blast in through these plurality of spaced air inlets 520 along the length of the oven, to blow cool air at a high rate across the tunnels and through the slots into the main oven passage itself, to thereby cool the entire web even though it is held stationary in the hot oven. It will be realized that in case of failure, even though the heat source lamps are shut off, considerable residual heat remains in the oven which would cause overheating damage and possible combustion of the web.

OVEN TO PRESS TRANSFER

Figure 17:
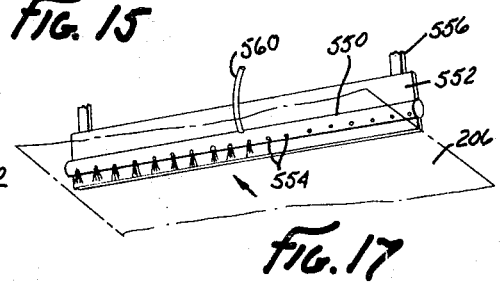
FIG. 17 is a fragmentary perspective view of the underside of baffling and zone cooling means at the juncture between the press and the preheat oven.

Another air control outlet portion of the apparatus is utilized to control the condition of the web between the outlet end of the oven and the inlet of the press. When deformation pressure is applied to the heated web inside the press to deform it, the drawing force applied to the heated softened web is very substantial. The chains grip the edges of the web in the oven very securely. But the deforming dies, particularly the matched dies as in FIG. 4, draw on the central portion of the web considerably at the stroke of the platens. This causes the web portion in the edge part 140' and 142' of the dies 140 and 142, immediately adjacent the oven, to tend to distort considerably. This causes the articles in this part of the die to be distorted and good only for scrap. It has been found that control of the web in this area is important to eliminate this defect which otherwise occurs with the stroke of the press. Preferably, this control of the web is achieved by controlling the characteristics of the web in this area, to prevent portions of the web from being stretched longitudinally between the heating oven and the dies. Referring to FIG. 20, at the end of the oven immediately adjacent press 12 is an elongated, transverse cool air manifold 550, and an adjacent transverse air baffle 552. Referring to FIG. 17, this combination of elements is shown in more detail, looking generally at the underside with respect to an imaginary web 206 shown in phantom as passing beneath these elements. The manifold 550 comprises an elongated tube, for example, with a plurality of adjacent spaced outlet air orifices 554 (or alternatively a slit) along its underside, directed toward web portion immediately therebeneath. Behind this manifold, i.e. between it and the outlet end of the oven, is baffle 552 which is suspended on suitable supports 556 at the end of the oven. This baffle prevents cold air from being blown back into the oven. Another baffle may be employed on the other side of the manifold, but normally is not found necessary.

The manifold is supplied by cool air through a suitable air inlet duct 560. It directs cool air at the web only at controlled intervals, when necessary, and does not blow out cold air constantly. The web, heated in the oven and advanced into the press in intermittent fashion, is not cooled while moving beneath this manifold, but only after the web section which is to be die formed is moved into the press and the web has stopped. Then this air manifold blows cool air on a narrow strip of web transverse to its longitudinal dimension, between the oven and the press. This strengthens the web in this transfer zone, by cooling it. Thus, the preheated web in the press can be properly formed in its softened condition since a narrow zone a couple of inches wide across the web is cooled and strong, to prevent excessive drawing action along the length of the web when the die elements deform it. The deformation is limited to the specific zone of the web between the dies, rather than extending therebeyond.

Conceivably, this air cooling function could be supplemented by, or substituted by, a mechanical gripping means such as that shown in FIG. 22. The web is controlled in this less preferred instance by gripping the small transverse transfer section thereof by a pair of cooperative intermeshing elements 143 and 145 attached to the upper and lower platens adjacent the dies used, e.g. 140 and 142. These meet with closing of the dies to squeeze and grip this transfer zone portion of the web momentarily between their interengaging rib and groove while the forming operation occurs. Such a squeezing means could be cooled and/or simply a pair of interfitting corrugated elements, located where the air manifold is, to grip this section of the web while it is being formed.

CIRCUIT DIAGRAM AND OPERATION SEQUENCE VARIATIONS

Figure 7A:
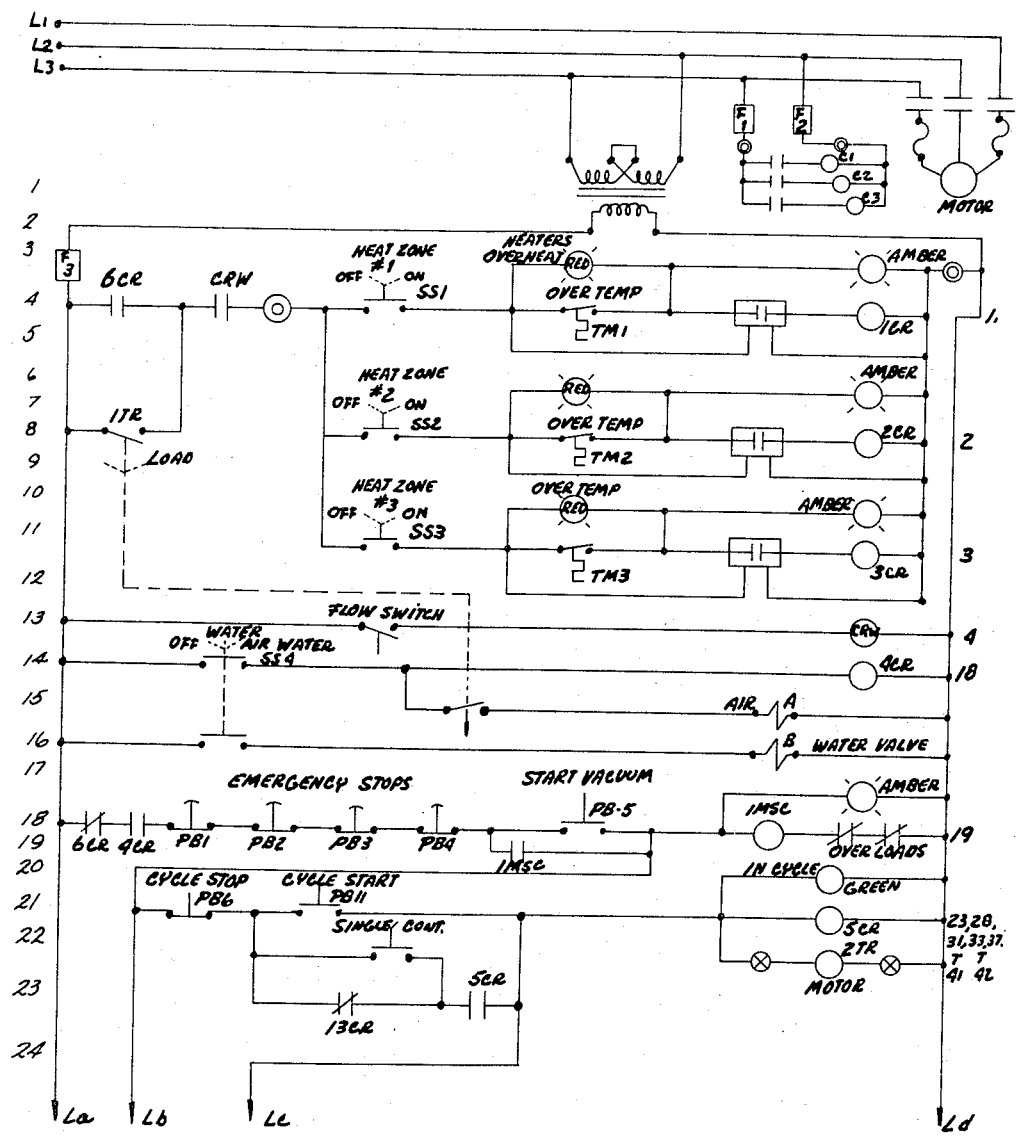
FIG. 7A is a diagrammatic view of the first portion of the electrical circuit diagram of the control system for the apparatus.
Figure 7B:
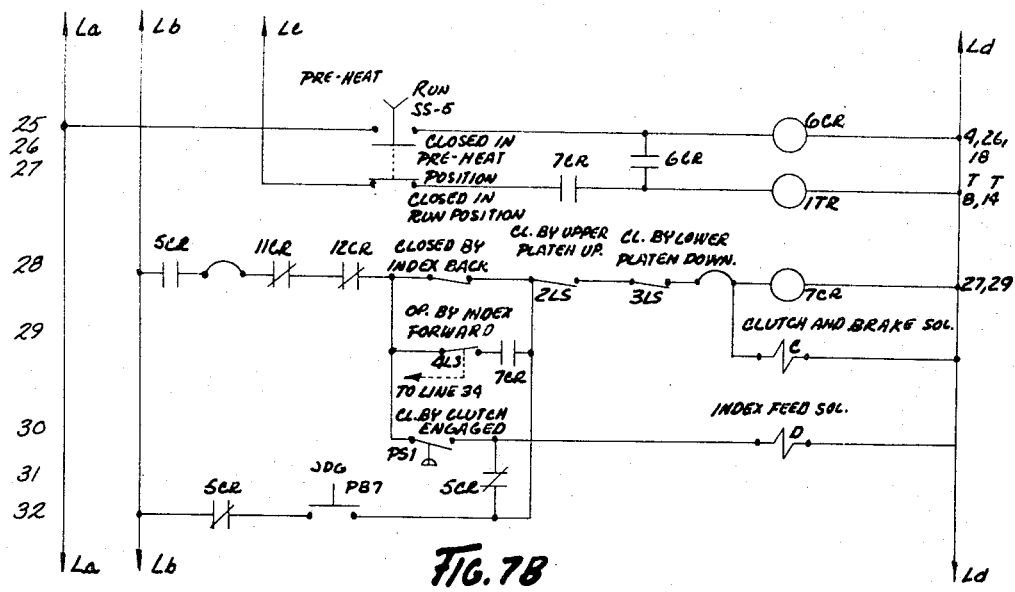
FIG. 7B is a diagrammatic view of a second portion of the circuit diagram forming an integral part of the circuit in FIG. 7A and 7C.
Figure 7C:
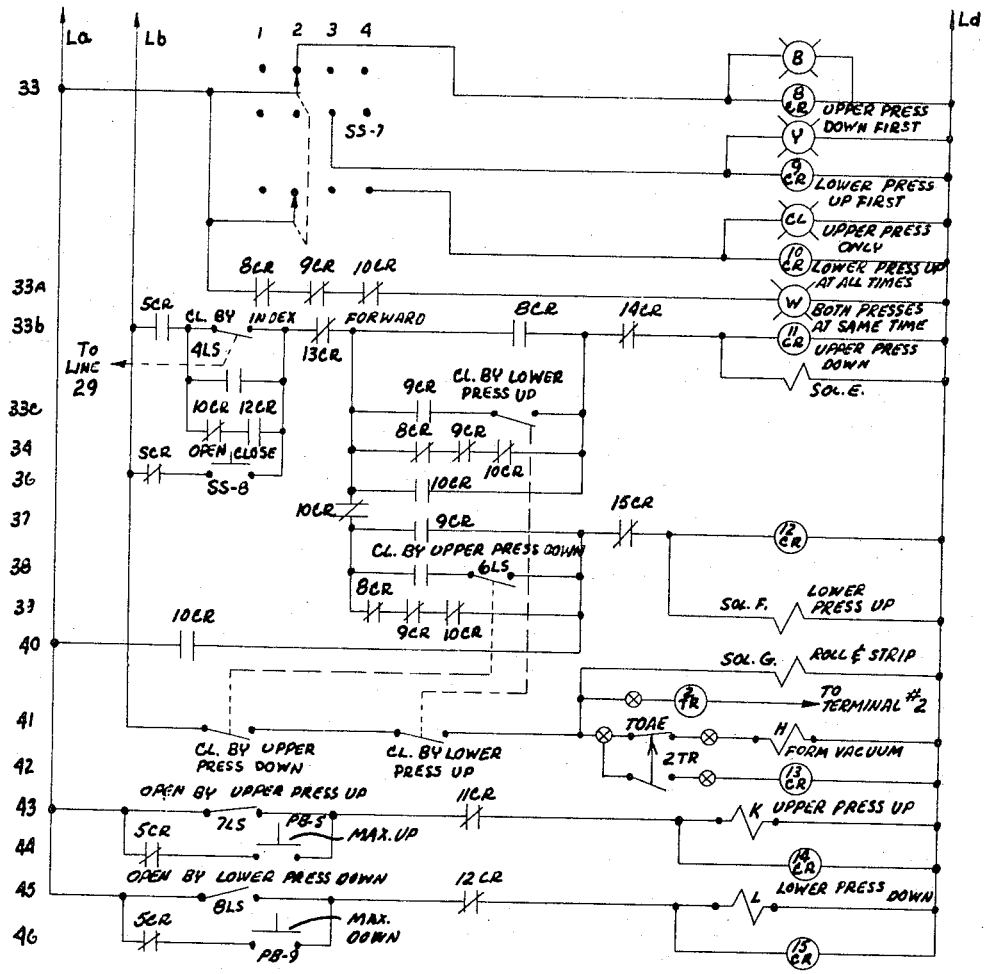
FIG. 7C is a diagrammatic view of a third portion of the circuit diagram in FIGS. 7A and 7B.

The operation of the apparatus can be understood best, in alternative forms, from studying the following outlined sequence of operations, with reference to the circuit diagram shown in FIGS 7a, 7b, and 7c. FIG. 7b is actually a continuation of FIG. 7a and should be placed immediately therebelow with leads La, Lb, Lc, and Ld aligned and likewise FIG. 7c is a continuation of FIG. 7b and should be placed below it with leads La–d aligned. In this circuit diagram, the designations noted have the following meanings: F means fuse; C means contactor; Trans. means transformer; Cr means relay or relay contact; SS means selector switch, PB means pushbutton; and TR means timer; the remaining abbreviations and wording is believed to be self-explanatory.

One having ordinary skill in the art will understand the operations from the following outlined.

SEQUENCE OF OPERATIONS FOR MODIFIED BOTTOM DELIVERY PRESS INCLUDING HEAT TUNNEL

A. *Preheat heat tunnel*

(1) Turn SS–4 to position "water" energizing water valve Sol. B.
(2) Flow switch closes energizing relay CRW to close contact CRW in Line 4.
(3) Turn SS–5 to position "preheat" energizing relay 6 CR.
(4) Contacts 6 CR in Line 4 and Line 26 close, contact 6 CR in Line 18 opens.
(5) Contact 6 CR in Line 4 closed will supply control power to temperature control units if SS–1, SS–2 and SS–3 are in "on" position. This will energize heating elements to preheat tunnel.
(6) Contact 6 CR in Line 26 closed energizes time relay ITR to by-pass air blow safety circuit.
(7) Contact 6 CR in Line 18 opened will prevent form press operation in preheat condition. In this condition the heat tunnel will heat up to the desired temperature and maintain it.

B. *Automatic form press cycle*

(1) Turn on hydraulic unit.
(2) Turn SS–4 in "air-water" position, energizing relay 4 CR to close contact 4 CR in Line 18. This will assure that safety air blow circuit is energized before press operation.
(3) Turn SS–5 in "run" position, de-energizing relay 6 CR and time relay ITR. Note: Time Relay ITR starts to time and if form cycle has not been started before ITR times out, the safety air blow circuit will function. At this time, contact ITR in Line 8 opens, de-energizing the heat tunnel control and ITR contact in Line 14 closes, energizing Sol. A to blow air. The time delay of ITR relay should be adjusted to approximately two times the form press cycle time.
(4) Depress PB–5 to start vacuum unit. Contact 1 MSC closes in Line 19 to supply control power to wire #24.
(5) Turn SS–6 in "continuous" position and depress PB–11 energizing relay 5 CR to start cycle. Relay 5 CR seals itself through SS–6 and contact 5 CR in Line 23.
(6) Relay 11 CR and 12 CR de-energized and limit switches 1LS, 2LS and 3LS closed energize relay 7 CR and Sol. C to engage clutch and disengage brake. Relay 7 CR seals itself thru 4LS and contact 7 CR in Line 29.
(7) Clutch engaged closes PS1 energizing Sol. D to extend index cylinder.
(8) Index cylinder extended opens 4LS de-energizing relay 7 CR and Sol. C to disengage clutch and set the brake.
(9) Clutch disengaged, opens PS–1 de-energizing Sol. D to retract index cylinder.
(10) Selector switch setting SS–7 determines the sequence of the upper and lower press.
 (A1) SS–7 in "1" position upper and lower press cylinder actuate simultaneously. Relay 8, 9 and 10 CR de-energized.
 (A2) Index cylinder extended, closes 4LS and contacts 8 CR, 9 CR and 10 CR in Lines 34 and 29 closed energize relay 11 CR Sol. E to extend upper press cylinder and relay 12 CR Sol. F to extend lower press cylinder.

(B1) SS–7 in "2" position extends upper press cylinder first. Relay 8 CR energized—relay 9 CR and 10 CR de-energized.

(B2) Index cylinder extended closes 4LS and contact 8 CR in Line 33B closed, energize relay 11 CR and Sol. E to extend upper press cylinder.

(B3) Upper press cylinder extended, closes 6LS energizing 12 CR Sol. F to extend lower press cylinder.

(C1) SS–7 in "3" position extends lower press cylinder first. Relay 9 CR energized—relay 8 CR and 10 CR de-energized.

(C2) Index cylinder extended closes 4LS, and contact 9 CR in Line 37 closed, energizes relay 12 CR Sol. F to extend lower press cylinder.

(C3) Lower press cylinder extended, closes 5LS energizing 11 CR Sol. E to extend upper press cylinder.

(D1) SS–7 in "4" position locks lower press cylinder in extended position and sequences the upper press cylinder only. Relay 10 CR energized—relay 8 CR and 9 CR de-energized.

(D2) Relay 12 CR Sol. F is continuously energized by contact 10 CR in Line 40, keeping the lower press cylinder extended.

(D3) Index cylinder extended closes 4LS and contact 10 CR in Line 36 closed, energize relay 11 CR Sol. E to extend upper press cylinder.

(11) Upper press cylinder extended, closes 6LS and lower press cylinder extended closes 5LS energizing timer 2TR, Sol. G to strip material and Sol. H to open vacuum valve.

(12) Timer 2TR times out opening contact 2TR in Line 41 and closing 2TR contact in Line 42.

(13) Contact 2TR in Line 41 opened, de-energizes Sol. H to close vacuum valve.

(14) Contact 2TR in Line 42 closed energizes relay 13 CR to open contact 13 CR in Line 33B.

(15) Contact 13 CR in Line 33B opened, de-energizes relays 11 CR and 12 CR (SS–7 position "1", "2" and "3" only). In SS–7 position "4" relay 11 CR is de-energized only.

(16) Contact 11 CR in Line 43 closed energizes relay 14 CR and Sol. K to retract upper press cylinder.

(17) Contact 12 CR in Line 45 closed, energizes relay 15 CR and Sol. L to retract lower press cylinder. This completes one cycle of the form press. If selector switch SS–6 was placed in "single" relay 5 CR is de-energized at the end of the cycle by the opening of contact 13 CR in Line 23. Therefore, a recycling has to be initiated by depressing PB–11.

It will be realized from the detailed description given above that there are several inventions involved in this unique apparatus. Since all of these are best understood in the context and in combination with the components with which they are found, the entire description is given herein.

It will also be obvious to those having ordinary skill in this art that the apparatus described has several unique functions, and achieves a control over the preheating forming and advancing of the web which has not been possible heretofore. Even materials such as foam-type web can be handled and operated upon dependably for hours upon hours in an automated, high production manner. This has been proven by experimental use. By simple manipulations of the novel apparatus, the press can be converted to operate on materials which need substantial preheating, or on relatively thin webbing which can be heated practically instantly to be formed by pressure differential techniques. There is accuracy of platen movement to achieve this pressure differential action, even when using a knife edge type sealing and creasing action which necessitates control of the knife edge and platens within a few thousandths of an inch. There is substantial flexibility and relatively large stroke capacity to achieve mechanical forming action, rapidly, with matching dies with or without pressure differential assist. Any dies can be substituted on the upper and lower platens by any conventional clamping means or bolting action so that the press is adaptable readily and in a matter of minutes to do one type of operation or another. Its upper and lower platens can be adjusted to specific positions for exactly controlled operation thereof, simultaneously with the double stroke action, or alternatively.

The lower platen can be locked in position for movement only of the upper platen. In such a case, the lower platen has complete rigidity and stability, capable of holding its particular lower position even when substantial force is applied. This takes the place of the old type in which the lower platen was a very heavy bed to achieve stability.

Various additional advantages and minor modifications of the apparatus will occur to those in the art upon studying the foregoing detailed description. Various detailed changes in construction can be made to suit particular types of surroundings, particular types of forming dies and techniques, particular types of plastics and sheet thicknesses to be handled, and other related factors. The invention is intended to be limited only by the scope of the appended claims and the reasonably equivalent structures and methods to those defined therein.

We claim:

1. Advancing apparatus for a plastic web comprising: a pair of parallel, elongated, coplanar, hard, slide surfaces for supporting the edges of a web; a pair of continuous, circulatory drive elements adjacent to and cooperative with said slide surfaces; each of said elements having along its length tiny sharp projections therefrom toward the adjacent slide surface; a plurality of rotatable, spaced guides engaging said elements; means biasing said guides against said elements to bias said elements toward said slide surfaces; said biasing means comprising a plurality of biasing springs for the respective guides; a pair of elongated adjustors along opposite sides of the apparatus and mounting said springs; and control means operably associated with said elongated adjustors to controllably shift said adjustors for simultaneously and uniformly changing the bias on all said guides along each edge.

2. Advancing apparatus for a plastic web comprising: a pair of parallel, elongated, coplanar, hard, slide surfaces for supporting the edges of a web; a pair of continuous, circulatory drive elements adjacent to and cooperative with said slide surfaces; each of said elements having along its length tiny sharp projections therefrom toward the adjacent slide surface; a plurality of rotatable, spaced guides engaging said elements; a plurality of pivot units mounting the respective guides for movement toward and away from said elements; means biasing said guides against said elements to bias said elements toward said slide surfaces; said biasing means comprising a plurality of biasing springs for the respective guides; said biasing springs engaging said pivot units to bias them toward said elements; a pair of elongated adjustors along opposite sides of the apparatus and mounting said springs; and control means operably associated with said elongated adjustors to controllably shift said adjustors for simultaneously and uniformly changing the bias on all said guides along each edge.

3. Plastic web advancing means for forming apparatus comprising: web engaging means and means mounting said web engaging means for movement thereof, including a pair of parallel, elongated, coplanar, hard slide surfaces for supporting the edges of a web; a pair of drive chains adjacent to and cooperative with said slide surfaces; each of said chains having along its length tiny sharp projections therefrom toward the adjacent slide surface; a plurality of guide sprockets engaging said chains; means biasing said sprockets against said chains to bias said chains toward said slide surfaces; drive means operably associated with said web engaging means for advancement thereof, including power motor means, clutch means, and brake means; and drive control means operably associated with both said clutch means and said brake means, to simultaneously engage one and disengage the other, and vice versa, causing repeated cyclic advancement of said web engaging means and alternate braked stoppage thereof for maintaining proper registry of a web during intermittent advancement.

4. Plastic web advancing means for forming apparatus comprising: web engaging means and means mounting said web engaging means for movement thereof; a pair of parallel, elongated, coplanar, hard, slide surfaces for supporting the edges of a web; a pair of drive chains adjacent to and cooperative with said slide surfaces; each of said chains having along its length tiny sharp projections therefrom toward the adjacent slide surface; a plurality of guide sprockets engaging said chains; means biasing said sprockets against said chains to bias said chain toward said slide surfaces; said biasing means comprising a plurality of biasing springs for the respective sprockets; a pair of elongated elements along opposite sides of the apparatus and mounting said springs; and control means operably associated with said elongated elements to controllably shift said elements for simultaneously changing the bias on sprockets along each edge; drive means operably associated with said web engaging means for advancement thereof, including power motor means, clutch means, and brake means; and drive control means operably associated with both said clutch means and said brake means, to simultaneously engage one and disengage the other, and vice-versa, causing repeated cyclic advancement of said web engaging means and alternate braked stoppage thereof for maintaining proper registry of a web.

5. Plastic web advancing means for forming apparatus comprising: movable web engaging means; drive means operably associated with said web engaging means for advancement thereof, including a reciprocable fluid power motor means, fluid responsive clutch means, and fluid responsive brake means; fluid control means operably associated with said power motor means and both said clutch means and said brake means, to simultaneously engage one of said clutch means and brake means and disengage the other with reciprocation of said power motor means in one direction, and simultaneously engage the other of said clutch means and brake means and disengage the other with reciprocation of said motor means in its opposite direction, causing repeated cyclic advancement of said web engaging means and alternate braked stoppage thereof for proper registry of a web; said control means including a fluid valve supplying fluid to both said clutch means and said brake means to one in a first position of said valve, and to another in a second position of said valve, thereby assuring alternate actuation and prevent simultaneous engagement of both said clutch means and brake means.

6. Plastic web advancing apparatus for forming equipment, comprising: a pair of spaced, opposite edge engaging, movable, continuous, web advancing means; drive motor means; a drive train between said drive motor means and said web advancing means; said drive train including rotatable drive shaft means with clutch means and brake means, including forwardly and rearwardly reciprocable gear rack, and a gear engaged with said gear rack and mounted on said drive shaft means; fluid cylinder means operably connected to said gear rack means to reciprocate it forwardly and rearwardly; solenoid operated fluid flow control valve means for said cylinder means; common control means for both said clutch means and brake means operative to cause said clutch means to be engaged and said brake means to be disengaged with forward reciprocation of said gear rack, and operative to cause said clutch means to be disengaged and said brake means to be engaged with reverse reciprocation of said gear rack.

7. The apparatus in claim 6 wherein said clutch means and brake means are both fluid actuated, and said common control means is a two position fluid valve to allow flow to said clutch means in one position and to said brake means in the other position.

8. The apparatus in claim 6 including a solenoid operated valve to said cylinder means to control its shifting in alternate directions; and said common control means comprising a single two position solenoid operated valve supplying fluid to both said clutch means and brake means in alternate positions.

9. Advancing apparatus for elongated plastic web stock comprising: a pair of parallel elongated coplanar glide elements having glide surface means for engaging one face of the opposite edges of the web; endless recirculatory drive elements adjacent the respective ones of said glide surface means, each having along its length a plurality of web indent grippers and a plurality of intermediate elongated web puncture elements; said glide element surface means being aligned with said indent grippers to allow web gripping therebetween; said elongated puncture elements normally projecting past said surface means to puncture a web thereon and projecting into receiving space adjacent said surface means.

10. Advancing apparatus for elongated plastic web stock comprising: a pair of parallel elongated coplanar glide elements having glide surface means for engaging one face of the opposite edges of the web; endless recirculatory drive roller chains adjacent the respective ones of said glide surface means, each having along its length a plurality of web indent grippers each of spreading teeth arranged in annular form, and a plurality of intermediate elongated web puncture needle elements; said glide element having a groove along its length and straddling shoulders forming surface means aligned with said indent grippers to allow web gripping therebetween; said elongated puncture needle elements normally projecting past said surface means to puncture a web thereon and projecting into receiving space in said grooves.

11. Plastic web advancing apparatus for equipment capable of forming articles in the web, comprising: a pair of parallel, elongated, cooperative web advancing means for gripping the side edges of the web, each including elongated chain means with web engaging protrusions thereon for engaging one face of the opposite web edges, and each including cooperative surface means for engaging the opposite faces of the opposite web edges; a plurality of rotatable spaced sprockets engaging each of said chain means; means biasing said sprockets against said chain means to bias said chain means toward said cooperative surface means; a pair of elongated adjustors along opposite sides of the apparatus and mounting said biasing means; and control means operably associated with said elongated adjustors to controllably shift said adjustors for simultaneously and uniformly changing the bias on all of said sprockets along each edge.

12. The apparatus in claim 11 including: drive motor means; a drive train between said motor means and said web advancing means; said drive train having rotatable drive shaft means with both clutch means and brake means operably associated therewith; said drive shaft means being intermittently rotatably shiftable; reciprocable power motor means associated with said drive shaft to rotate it; said clutch means being engaged and said brake means being disengaged with reciprocation of said power motor means in one direction, and said clutch means being disengaged and said brake means being engaged with reciprocation in the reverse direction; and control means operably associated with said power motor means and said clutch and brake means to assure alternate actuation of said latter two for alternately advancing and lockably stopping said web advancing means.

References Cited

UNITED STATES PATENTS

| | | | |
|---|---|---|---|
| 837,319 | 12/1906 | Meahl | 226—120 |
| 1,763,735 | 6/1930 | Wydom | 226—53 |
| 2,758,837 | 8/1956 | Littell et al. | 226—145 |
| 2,783,996 | 3/1957 | Forkner | 226—145 X |
| 2,961,137 | 11/1960 | Menkel | 226—53 |
| 3,029,991 | 4/1962 | Von Allmen | 226—156 |
| 3,034,364 | 5/1962 | Budlong | 226—145 X |
| 3,112,055 | 11/1963 | Hartley | 226—156 X |
| 3,160,340 | 12/1964 | Menkel | 226—53 |

M. HENSON WOOD, Jr., *Primary Examiner.*

ALLEN N. KNOWLES, *Examiner.*